(12) United States Patent
Pradier et al.

(10) Patent No.: US 12,049,958 B2
(45) Date of Patent: Jul. 30, 2024

(54) PARKING LOCK SYSTEM FOR A TRANSMISSION OF A MOTOR VEHICLE GEARBOX OR REDUCTION UNIT

(71) Applicant: DURA AUTOMOTIVE HOLDINGS U.K., LTD, Birmingham (GB)

(72) Inventors: Philippe Pradier, Sorbiers (FR); Xavier Lecrinier, Saint Etienne (FR)

(73) Assignee: DUS OPERATING INC., Auburn Hills, MI (US)

( * ) Notice: Subject to any disclaimer, the term of this patent is extended or adjusted under 35 U.S.C. 154(b) by 0 days.

(21) Appl. No.: 18/514,290

(22) Filed: Nov. 20, 2023

(65) Prior Publication Data

US 2024/0175492 A1    May 30, 2024

(30) Foreign Application Priority Data

Nov. 29, 2022 (EP) .................................... 22210374

(51) Int. Cl.
*F16H 63/34* (2006.01)
(52) U.S. Cl.
CPC ................. *F16H 63/3433* (2013.01)
(58) Field of Classification Search
CPC .................................................. F16H 63/3433
See application file for complete search history.

(56) References Cited

U.S. PATENT DOCUMENTS

| 11,920,679 | B2* | 3/2024 | Wetzel | F16H 63/3491 |
| 2016/0033037 | A1* | 2/2016 | Rhoades | F16H 63/3433 |
| | | | | 74/411.5 |
| 2017/0130794 | A1* | 5/2017 | Spaulding | B60T 7/104 |
| 2019/0257422 | A1* | 8/2019 | Schlosser | F16H 63/3433 |
| 2020/0072351 | A1* | 3/2020 | Chen | F16D 63/006 |
| 2023/0076082 | A1* | 3/2023 | Hou | F16H 63/3425 |

FOREIGN PATENT DOCUMENTS

| DE | 102005024468 A1 | 1/2009 |
| DE | 102017212466 A1 | 1/2019 |
| EP | 2410214 A2 | 9/2013 |
| EP | 2410214 A3 | 9/2013 |
| EP | 3620690 A1 | 3/2020 |
| WO | 2008078017 A1 | 7/2008 |

* cited by examiner

*Primary Examiner* — Lori Wu
(74) *Attorney, Agent, or Firm* — Vivacqua Crane, PLLC

(57) ABSTRACT

A parking lock system for a motor vehicle transmission includes a latch pivotingly movable from a locking position engaged in a cavity of a locking wheel rotatably linked to an output of the transmission, to an unlocking position disengaged from the cavity. A carriage is mounted at the end of a rod and slides to a locking position. The carriage forces the pivoting of the latch in the locking, or the unlocking position. A first lever is connected to the rod, and pivots to push or pull the rod. A second lever pivots via an actuator. A spring positioned between the levers has a return force being less than the force to make the second lever pivot, such that the pivoting of the first lever leads to either: pivoting of the second lever and engagement of the latch when it is facing a cavity, or compression of the spring.

5 Claims, 3 Drawing Sheets

PARKING LOCK SYSTEM FOR A TRANSMISSION OF A MOTOR VEHICLE GEARBOX OR REDUCTION UNIT

CROSS-REFERENCE TO RELATED APPLICATIONS

The invention claims the benefit of the filing date of European Patent Application No. EP22210374.9, the disclosure of which is incorporated herein by reference in its entirety.

TECHNICAL FIELD

The invention relates to the technical field of gearboxes, for example automatic gearboxes, for motor vehicles of any type, such as hybrid or electric.

The invention also applies to reduction units present in electric vehicles which do not have gears as such.

More specifically, the invention relates to a parking lock system for such a gearbox or reduction unit.

PRIOR ART

In the current state of the art, a parking lock system is known from document EP3620690, for a transmission of a motor vehicle gearbox or reduction unit, the system comprising:
  a latch pivotingly mounted to move from a locking position engaged in a cavity of a locking wheel rotatably linked to an output of the transmission, to an unlocking position disengaged from the cavity;
  a carriage mounted at an end of a guide rod and sliding to alternatively adopt a locking position, wherein the carriage forces the pivoting of the latch in the locking position, or an unlocking position, wherein the latch is returned by a first spring into the unlocking position;

In a known manner, the carriage comprises a first roller and a second roller, each mounted free in rotation around a pin. The first roller is positioned to be able to roll against the latch during the carriage passage into the locking position, and the second roller is positioned to roll, in abutment, on a fixed wall of the system, opposite the latch.

In principle, these systems are subjected to means preventing actuating them, when the vehicle is moving. For example, these means can be computerised and electronically controlled. However, such electronically controlled means do not make it possible to detect that the vehicle is moving, when it moves at a speed of less than 3 km/h.

From the above, these locking systems can be actuated, even if the vehicle is moving, and in particular, at a speed of less than 3 km/h. During the actuation of the system, the carriage therefore pushes the latch into a locking position, in which the finger of the latch must be engaged in a cavity of the wheel linked to the transmission.

However, given that the vehicle is moving, the wheel which has recessed parts, and which is linked to the transmission, is always rotating. This results that the latch, pushed by the carriage, hits and bounces against the wheel, until the moment when the finger of the latch arrives, after multiple attempts, penetrates into the cavity of the wheel.

These successive impacts of the finger of the latch against the wheel are more generally known as the "ratcheting" phenomenon, are transmitted to the different elements of the locking system, and are the cause of early premature deteriorations of the wheel, and/or of the latch, and/or of the locking system as such.

It is known, from this same document, to position a compression spring around the rod, between the rear wall of the casing and the carriage, in order to push said carriage into the locking position directly with the spring. In this way, when the carriage is repelled suddenly rearwards during the "ratcheting" phenomenon, the carriage is dampened by the spring, which decreases the risk of deterioration.

However, this design can be further improved, in particular in terms of resistance to said "ratcheting" phenomena.

SUMMARY OF THE INVENTION

The aim of the present invention, is therefore to provide a locking system making it possible to overcome the disadvantages of the prior art, by having a design, enabling it to further resist the "ratcheting" phenomena.

To this end, a parking lock system has been developed, for a transmission of a motor vehicle gearbox or reduction unit, the system comprising: a latch pivotingly mounted to move from a locking position engaged in a cavity of a locking wheel rotatably linked to an output of the transmission, to an unlocking position disengaged from the cavity; a carriage mounted at the end of a guide rod and sliding to alternatively adopt a locking position, in which the carriage forces the pivoting of the latch in the locking position, or an unlocking position, in which the latch is returned by a first spring into the unlocking position.

According to the invention, the system comprises: a first lever connected to the rod, and pivoting to push or pull the rod and cause the sliding of the carriage; a second lever intended to be pivoted by an actuator; a second spring positioned between the first lever and the second lever, the return force of the second spring being less than the force necessary to make the second lever pivot, such that the pivoting in a first direction of the first lever leads to the pivoting of the second lever and the engagement of the latch if it is facing a cavity of the locking wheel, otherwise the compression of the second spring.

The construction of the present invention therefore makes it possible to "reinforce" the rod, awaiting the latch to be able to be engaged in a cavity of the wheel.

During the "ratcheting" phenomenon, the impacts of the latch on the wheel of the transmission suddenly repel the latch into the unlocking position, wherein it suddenly hits and repels the carriage into the unlocking position. The carriage, itself, is repelled into the locking position by the second lever, and therefore undergoes rapid back-and-forths between the locking and unlocking positions.

In this situation, it is the second spring which absorbs the returns of the carriage, the second lever only pivots towards the engagement position of the latch when the latch is facing a cavity of the wheel. In other words, the second spring acts as a buffer, and accumulates the pivoting energy from the first lever, awaiting to be able to return it to the second lever when the latch can be engaged with the locking wheel. The design with the two pivoting levers is reliable and solid, the risks of deteriorations are decreased.

Preferably, the second lever comprises a part intended to bear against the first lever when the first lever is pivoted in a second direction, so as to force the pivoting of the second lever in the second direction corresponding to the disengagement of the latch.

Thus, the return of the carriage into the unlocking position is forced by pivoting in a second direction of the second lever, in particular, driven by the actuator.

The first spring and/or the second spring are of any suitable type, for example, compression springs. According to an embodiment of a simple and reliable design, the first spring and/or the second spring are torsion springs.

In order to have a more compact and reliable mounting, while decreasing the number of parts, the first lever and the second lever are pivotingly mounted about one same axis.

Preferably, and to further increase the resistance to "ratcheting" phenomena, the carriage comprises a first roller and a second roller, each mounted free in rotation around a pin, the first roller being positioned to roll against the latch during the passage of the carriage into the locking position, and the second roller being positioned to roll in abutment on a fixed wall of the system, opposite the latch, the carriage being in the form of a cage with open upper and lower walls for the radial protrusion of the rollers.

BRIEF DESCRIPTION OF THE DRAWINGS

Other features and advantages of the invention will clearly emerge from the description made below, for information and in a not-at-all limiting manner, in reference to the accompanying figures, wherein.

DETAILED DESCRIPTION OF THE INVENTION

In reference to FIGS. 1 to 6, the invention relates to a parking lock system (1) for a transmission of a reduction unit or a gearbox, for example automatic, of motor vehicles, and preferably an electric or hybrid vehicle.

The system comprises a casing (2) made by at least one folded and cut sheet, intended to be fixed to a fixed part of the reduction unit or the gearbox of the vehicle.

Figure 1:
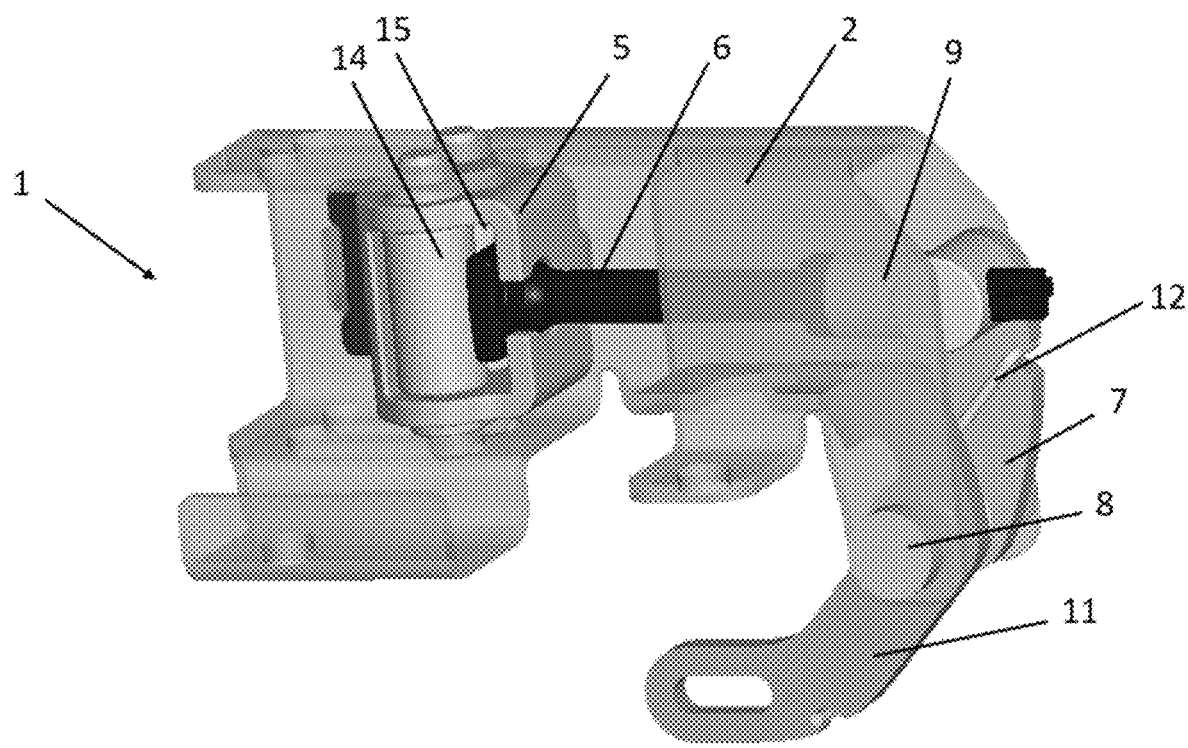
FIG. 1 is a perspective view of the parking lock system, according to the present invention.
Figure 2:
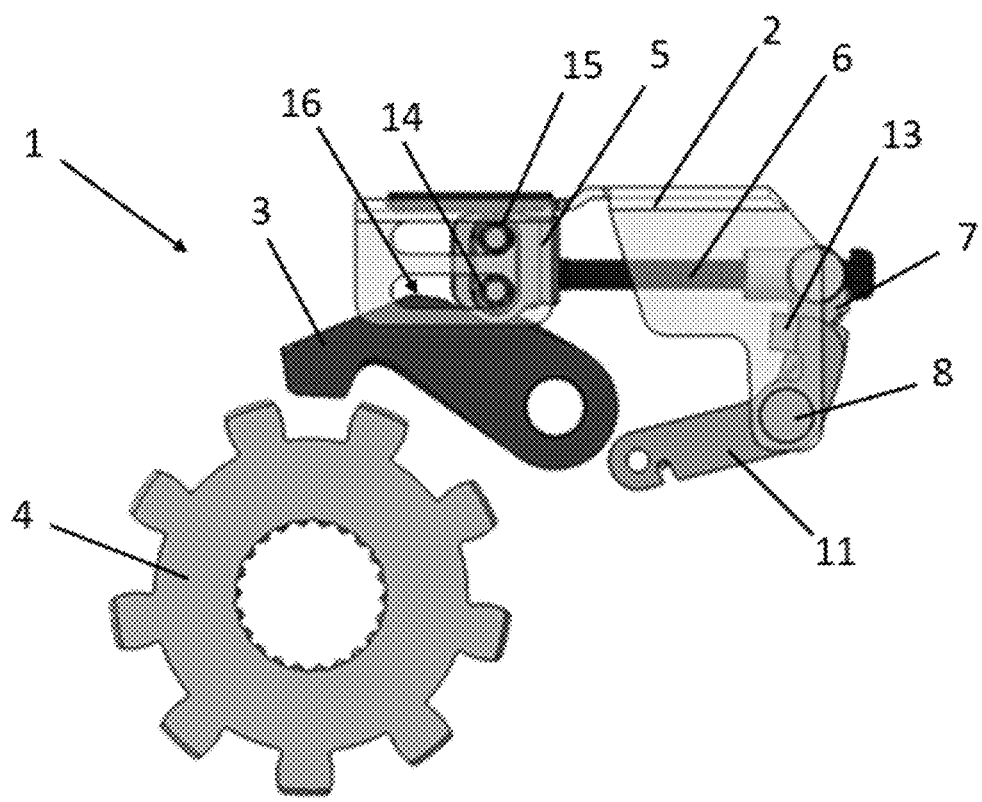
FIG. 2 is a schematic view illustrating the latch in the unlocking position.
Figure 3:
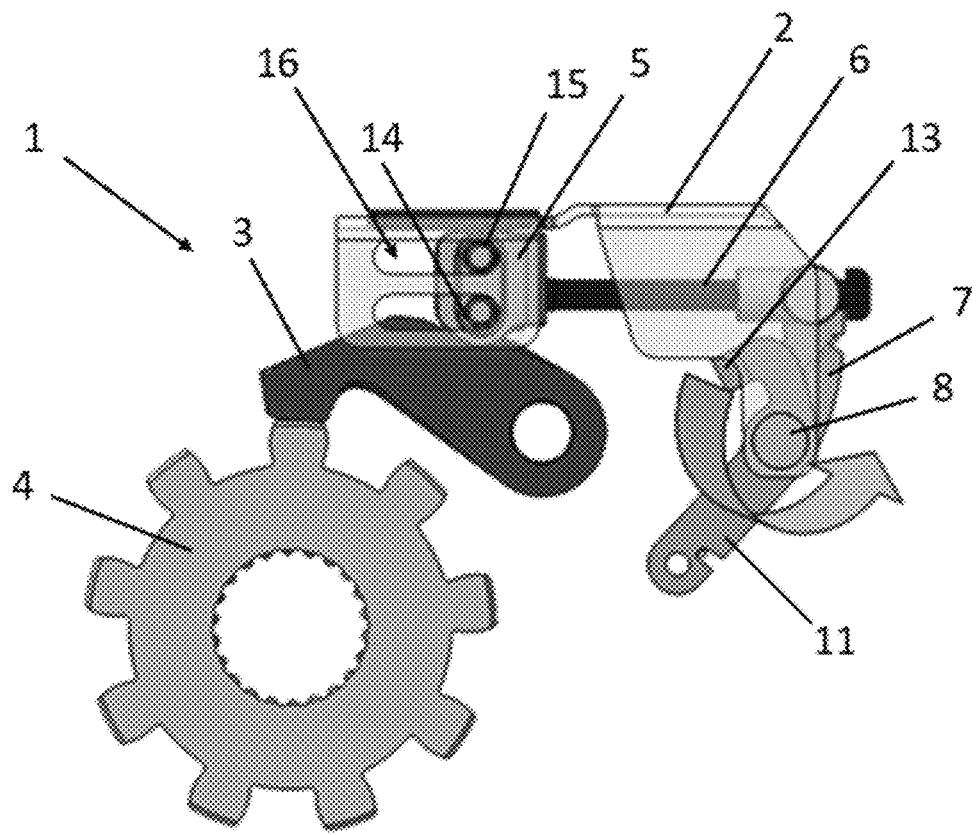
FIG. 3 is a view similar to that of FIG. 2, the latch not facing a cavity, which can create a "ratcheting" phenomenon.
Figure 4:
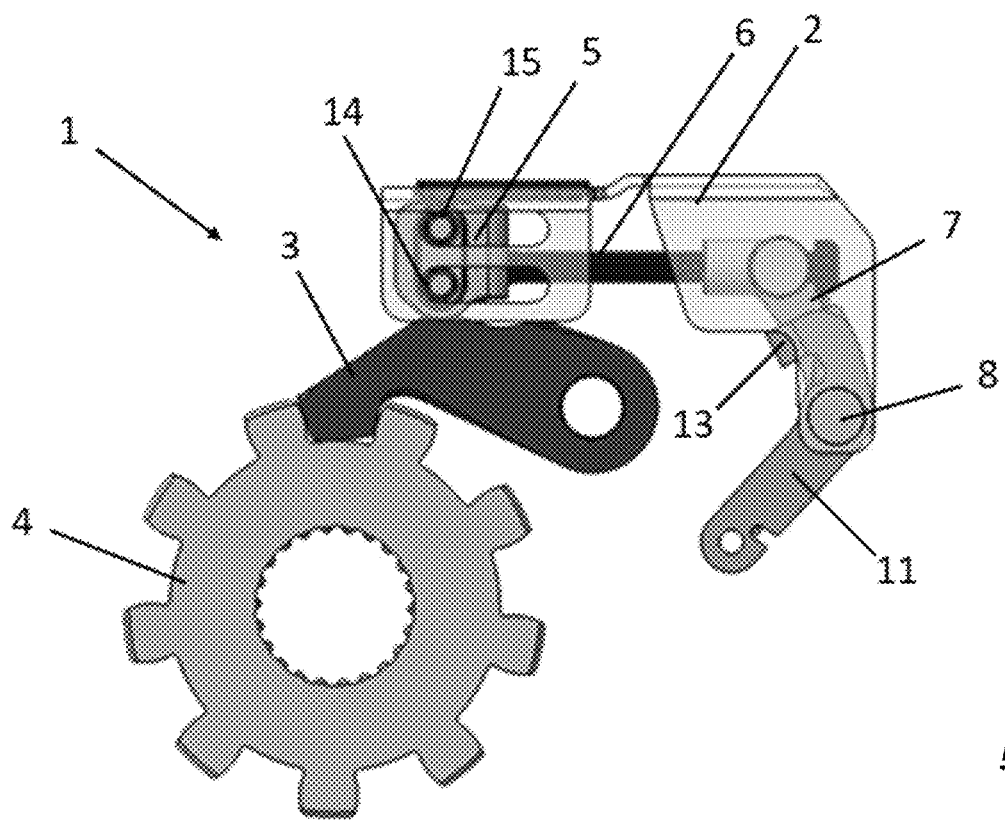
FIG. 4 is a view similar to that of FIG. 3, the latch being in the locking position.

A latch (3) is disposed inside the casing (2), and pivotingly mounted about an axis to move from a locking position engaged in a cavity of a locking wheel (4) rotatably linked to an output of the transmission, see FIG. 4, to an unlocking position disengaged from the cavity, see FIG. 2.

In a known manner, the latch (3) is maintained, and returned into an unlocking position by way of a first spring, not represented, for example in the form of a torsion spring, arranged about the axis of the latch (3), and engaging with the fixed parts of the casing (2).

The casing (2) internally comprises a carriage (5) slidingly mounted to alternatively adopt a locking position, wherein the carriage (5) forces the pivoting of the latch (3) into the locking position, see FIG. 2, or an unlocking position, wherein the latch (3) is returned by the first spring into the unlocking position, see FIG. 4.

More specifically, the carriage (5) is mounted at the end of a guide rod (6), itself connected to a first lever (7), pivoting about an axis (8) to push or pull the rod (6) and cause the sliding of the carriage (5).

Figure 5:
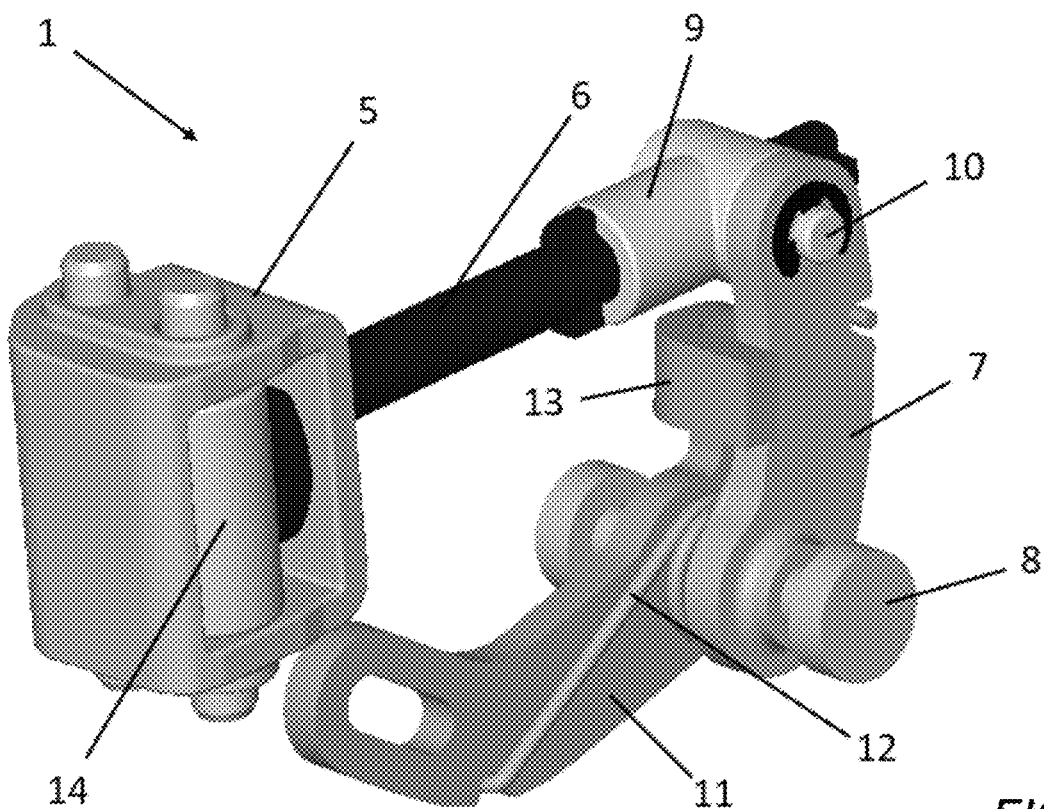
FIG. 5 is a perspective view of the system, the second lever not being actuated, the carriage being in the unlocking position.
Figure 6:
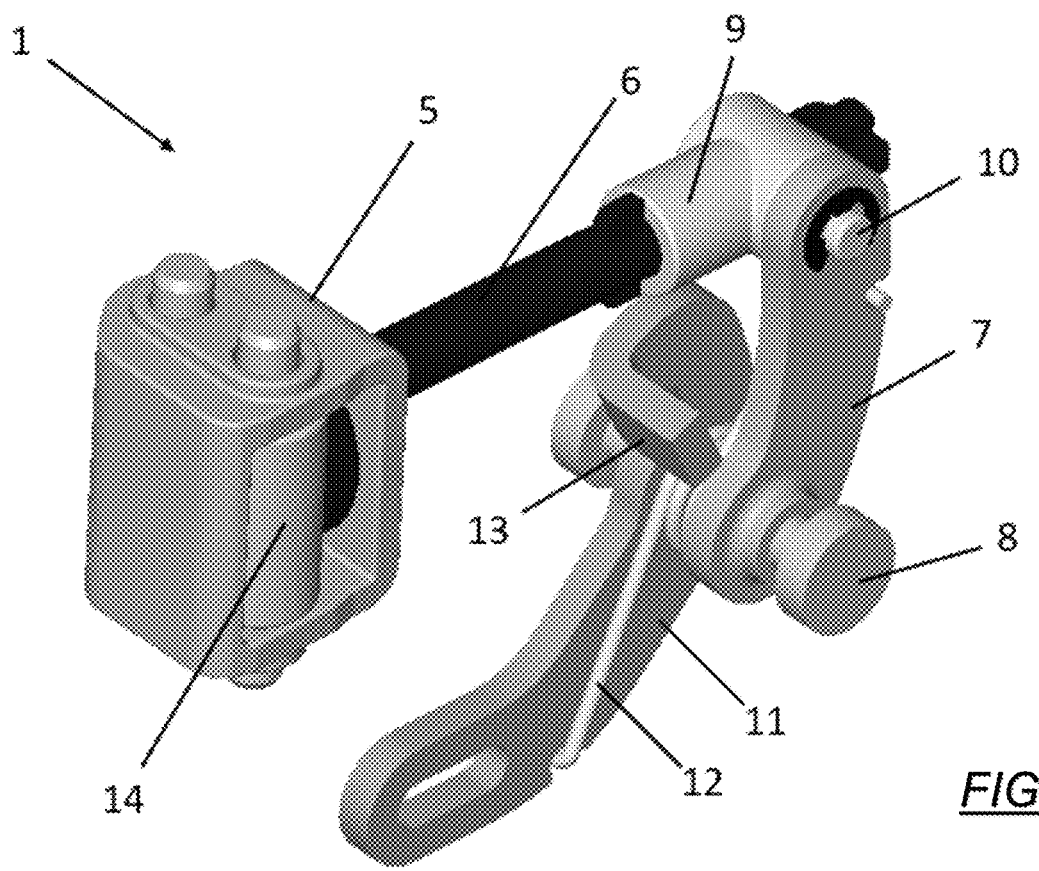
FIG. 6 is a perspective view of the system, similar to that of FIG. 5, the second lever being actuated to move the carriage being in the unlocking position, but the second spring being compressed to await the latch being able to be engaged with a cavity of the locking wheel.

For example, the rod (6) is inserted and locked in a sleeve (9), see FIGS. 5 and 6, from which a nipple (10) extends, perpendicularly to the rod (6), around which a first end of the first lever (7) is pivotingly mounted. In other words, the first lever (7) is pivotingly connected to its two ends.

The system (1) comprises a second lever (11), preferably pivotingly mounted about the same axis (8) as the first lever (7), and intended to be pivoted by an actuator, not represented.

According to an advantageous design, the system (1) comprises a second spring (12), in particular a second torsion spring (12), positioned about the pivot axis (8) between the first lever (7) and the second lever (11), the return force of which is less than that force necessary to make the second lever (11) pivot. Naturally, the second spring (12) can be presented in the form of a compression spring without leaving the scope of the invention.

In this way, the pivoting in a first direction of the first lever (7) leads to the pivoting of the second lever (11) and the engagement of the latch (3) if it is facing a cavity of the locking wheel (4). And, if the latch (3) is not facing a cavity, or if the locking wheel (4) rotates such that the "ratcheting" phenomenon occurs, the second spring (12) is compressed to "arm" the first lever (7), and pushes the rod (6) when the engagement of the latch (3) will be possible.

The second lever (11) comprises a part (13), in the form of a tab, intended to bear against the first lever (7) when the first lever (7) is pivoted in a second direction, in particular, that corresponding to the passage of the carriage (5) into the unlocking position, so as to force the pivoting of the second lever (11) in the second direction corresponding to the disengagement of the latch (3).

To guide and facilitate the movements of the carriage (5), the carriage (5) comprises a first roller (14) and a second roller (15), each mounted free in rotation around a pin, with the first roller (14) positioned to roll against the latch (3) during the passage of the carriage (5) into the locking position, and with the second roller (15) positioned to roll in abutment on a fixed wall of the system, opposite the latch (3). The axis of rotation of the rollers (14, 15) can be parallel to the pivot axis (8) of the levers (7, 11), see FIGS. 2 to 4, or actually perpendicular, see FIGS. 1, 5 and 6.

More specifically, the carriage (5) is presented in the form of a cage inside which are received, in a floating manner, the first roller (14) and the second roller (15), as well as the guide rod (6). The carriage (5) has, in particular, open upper and lower walls for the radial protrusion of the rollers.

During the "ratcheting" phenomenon, the carriage (5), hit by the latch (3), moves according to sudden alternative movements between its locking position and its neutral position. In order to control these different positions, and to further resist the inherent impacts, at least one of the pins associated with the roller (14, 15), and preferably both of them, protrude on either side of the rollers (14, 15) to abut against fixed parts of the system forming the abutments of the locking and neutral positions of the carriage (5).

According to a particular embodiment, the side walls of the casing (2) are each perforated by at least one slot (16), and preferably each perforated by at least two guide slots (16) of the ends of the pins, said ends of the slots (16) forming the abutments, as such.

Preferably, and in order to ensure the floating character of the first and second rollers (14, 15), the carriage (5) comprises side walls in which are arranged, on each side, two orifices for receiving the pins, the diameters of which are greater than those of the pins.

In order to ensure a floating character to the rod (6) with respect to the carriage (5), the carriage (5) comprises a rear wall having an opening for receiving and engaging the rod (6), the dimensions of which are greater than those of the diameter of the rod (6).

According to a particular embodiment, the rod (6) for guiding the carriage (5) has a "T"-shaped end, disposed inside the carriage (5), in particular bearing against the rollers, and thus enabling a coupling between the rod (6) and the carriage (5).

Preferably, and as stated above, the rod (6) is in contact with the first roller (14) and the second roller (15). Moreover, the first roller (14) and the second roller (15) are also in contact with a front wall of the carriage (5), opposite the spring (10) and at the "T"-shaped end (15) of the rod (6), at least when the carriage (5) is pulled into the unlocking position by the rod (6).

Given that the pins associated with the rollers (14, 15) are used to abut in the neutral position and in the locking position of the carriage (5), this makes it possible to control the different positions of the carriage (5), mechanically reliably, and to avoid the deteriorations of the parts composing the locking system (1).

Totally independently, because of the rollers and the rod (6) are received in a floating manner inside the carriage (5), the forces, during the "ratcheting" phenomenon transmitted by the latch (3), are directly transmitted to the rod (6), by passing through the pins and the rollers (14, 15), but without passing through the carriage (5).

Also, also independently, the rod (6) is in permanent contact and continuously bears against the first roller (14) and the second roller (15), and the first roller (14) and the second roller (15) are in contact, and preferably permanently, with a front wall of the carriage (5), opposite the spring (10), such that the forces are directly transmitted to the rod (6), which absorbs and dissipates these impacts. This makes it possible, in particular, to have a system which can further resist "ratcheting" phenomena.

From the above, it results that the design of the locking system according to the invention has an increased resistance, capable of resisting "ratcheting" phenomena, by decreasing the risk of deterioration or breaking.

What is claimed is:

1. A parking lock system for a transmission of a motor vehicle gearbox or reduction unit, the system comprising:
   a latch pivotingly mounted to move from a locking position engaged in a cavity of a locking wheel rotatably linked to an output of the transmission, to an unlocking position disengaged from the cavity;
   a carriage mounted at an end of a guide rod and sliding to alternatively adopt a locking position, in which the carriage forces the pivoting of the latch in the locking position, or an unlocking in which, wherein the latch is returned by a first spring into the unlocking position;
   wherein the parking lock system further comprises:
   a first lever connected to the rod, and pivoting to push or pull the rod and lead to the sliding of the carriage;
   a second lever intended to be pivoted by an actuator; and
   a second spring positioned between the first lever and the second lever, the return force of the second spring being less than the force necessary to make the second lever pivot, such that the pivoting in a first direction of the first lever leads to the pivoting of the second lever and the engagement of the latch when the first lever is facing a cavity of the locking wheel, and otherwise compresses the second spring.

2. The system according to claim 1, wherein the second lever comprises a part intended to abut against the first lever when the first lever is pivoted in a second direction, so as to force the pivoting of the second lever in the second direction corresponding to the disengagement of the latch.

3. The system according to claim 1, wherein one or more of the first spring and the second spring are torsion springs.

4. The system according to claim 1, wherein the first lever and the second lever are pivotingly mounted about one same axis.

5. The system according to claim 1, wherein the carriage comprises: a first roller and a second roller, each of the first roller and the second roller are mounted free in rotation around a pin, the first roller being positioned to roll against the latch during passage of the carriage into the locking position, and the second roller being positioned to roll in abutment on a fixed wall of the system, opposite the latch, the carriage being in the form of a cage, with open upper and lower walls for radial protrusion of the rollers.

* * * * *